(12) United States Patent
Kurihara et al.

(10) Patent No.: US 11,569,522 B2
(45) Date of Patent: Jan. 31, 2023

(54) MANUFACTURING METHOD FOR FUEL CELL

(71) Applicant: TOYOTA JIDOSHA KABUSHIKI KAISHA, Toyota (JP)

(72) Inventors: Takuya Kurihara, Miyoshi (JP); Takumi Taniguchi, Toyota (JP); Kenji Sato, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 17/166,032

(22) Filed: Feb. 3, 2021

(65) Prior Publication Data
US 2021/0257641 A1 Aug. 19, 2021

(30) Foreign Application Priority Data
Feb. 19, 2020 (JP) .............................. JP2020-026059

(51) Int. Cl.
*H01M 8/1004* (2016.01)
*H01M 8/0273* (2016.01)

(52) U.S. Cl.
CPC ....... *H01M 8/1004* (2013.01); *H01M 8/0273* (2013.01)

(58) Field of Classification Search
CPC ........................... H01M 8/1004; H01M 8/0273
See application file for complete search history.

(56) References Cited

U.S. PATENT DOCUMENTS

| 2012/0009506 | A1 | 1/2012 | Tanahashi et al. |
| 2018/0366760 | A1* | 12/2018 | Shimomura ........ H01M 8/2404 |
| 2021/0320314 | A1* | 10/2021 | Nunoo ................ H01M 4/9075 |

FOREIGN PATENT DOCUMENTS

| JP | 2008123885 A | 5/2008 |
| JP | 5097158 B2 | 12/2012 |
| JP | 5825238 B2 | 12/2015 |

OTHER PUBLICATIONS

JP-5825238-B2—Machine Translation (Year: 2014).*

* cited by examiner

*Primary Examiner* — Brian R Ohara
*Assistant Examiner* — Patrick Marshall Greene
(74) *Attorney, Agent, or Firm* — Dickinson Wright, PLLC (57) ABSTRACT

A manufacturing method for a fuel cell includes the steps of: (a) preparing a stack and separators in a pair arranged in such a manner as to hold the stack therebetween; (b) forming a separator-bonded stack by bonding the separators in a pair and a sealing part to each other; and (c) warping a membrane electrode assembly with the bonded sealing part in a gap by reducing the temperature of the separator-bonded stack to cause thermal shrinkage of the separators in a pair, thereby moving the sealing part with the bonded separators in a pair inward.

2 Claims, 9 Drawing Sheets

MANUFACTURING METHOD FOR FUEL CELL

CROSS-REFERENCE TO RELATED APPLICATIONS

This application claims priority from Japanese patent application No. 2020-026059 filed on Feb. 19, 2020, the disclosure of which is hereby incorporated in its entirety by reference into this application.

BACKGROUND

Field

This disclosure relates to a fuel cell.

Related Art

According to a technique conventionally known relating to a fuel cell forming a fuel cell device, to reduce the occurrence of a crack in a membrane electrode assembly due to drying shrinkage of the membrane electrode assembly, the membrane electrode assembly is arranged in a state of being warped in normal humidity (Japanese Patent Publication No. 5825238). According to the conventional technique, after formation of a membrane electrode gas diffusion layer assembly, a sealing part and a separator are stacked in relative humidity of 0%, namely, in a drying state. Next, the stacked target is hot-pressed to be formed into a cell and then the membrane electrode assembly is stretched to be warped by setting relative humidity at normal humidity.

The conventional technique requires a step of drying the membrane electrode assembly and requires formation into a cell in the dried state. This causes a risk of complication of control such as humidity control during manufacturing process.

SUMMARY

According to one aspect of this disclosure, a manufacturing method for a fuel cell is provided. The manufacturing method for the fuel cell includes the steps of: (a) preparing a stack and separators in a pair arranged in such a manner as to hold the stack therebetween, the stack including a membrane electrode assembly having a first surface and a second surface on the opposite side of the first surface, a frame-like sealing part bonded to an outer edge of the first surface, a first gas diffusion layer having a smaller outer shape than the membrane electrode assembly in a plan view and arranged at the first surface across the sealing part and a gap, and a second gas diffusion layer arranged at the second surface; (b) forming a separator-bonded stack by heating the separators in a pair to thermally expand the separators in a pair and move the separators in a pair outward relative to the sealing part, and then bonding the separators in a pair and the sealing part to each other; and (c) warping the membrane electrode assembly with the bonded sealing part in the gap by reducing the temperature of the separator-bonded stack to cause thermal shrinkage of the separators in a pair, thereby moving the sealing part with the bonded separators in a pair inward, the step (c) being performed after the step (b).

DETAILED DESCRIPTION

A. Embodiment

Figure 1:
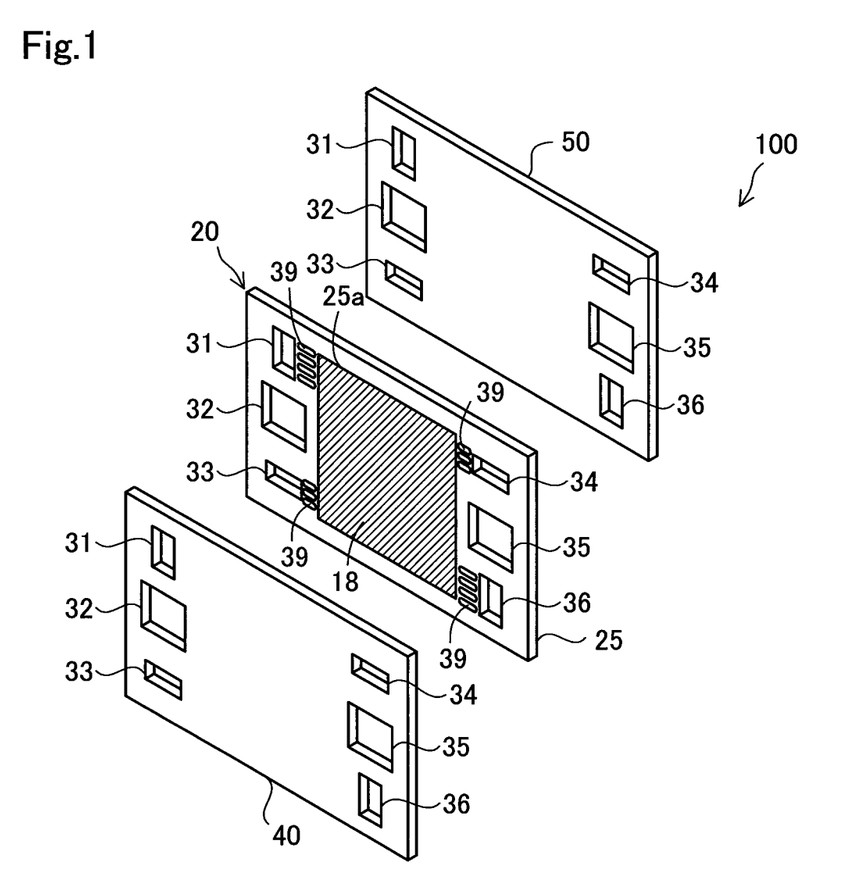
FIG. 1 is an exploded perspective view briefly showing the configuration of a unit cell.
Figure 2:
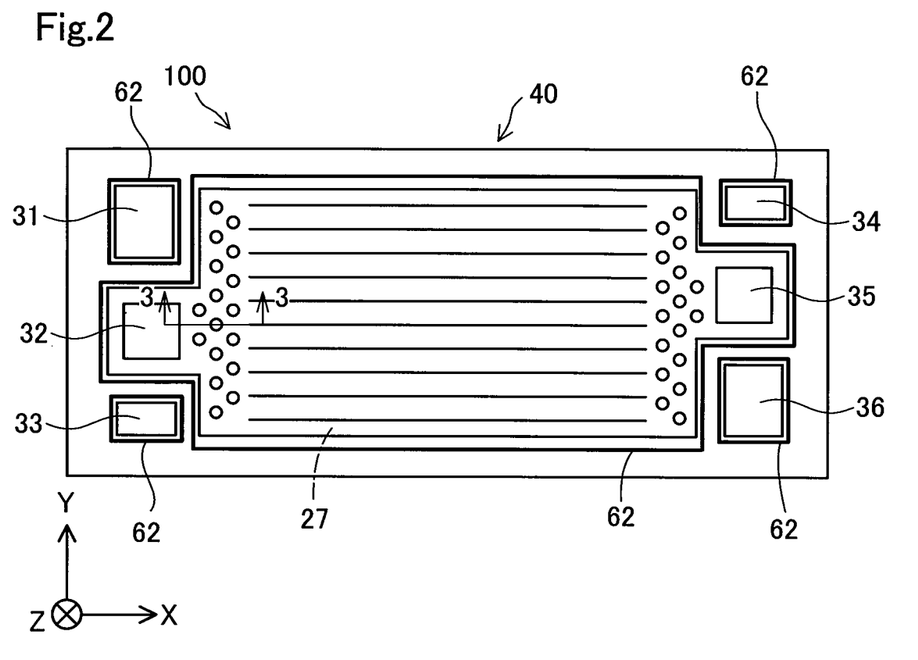
FIG. 2 is a plan view of the unit cell.
Figure 3:
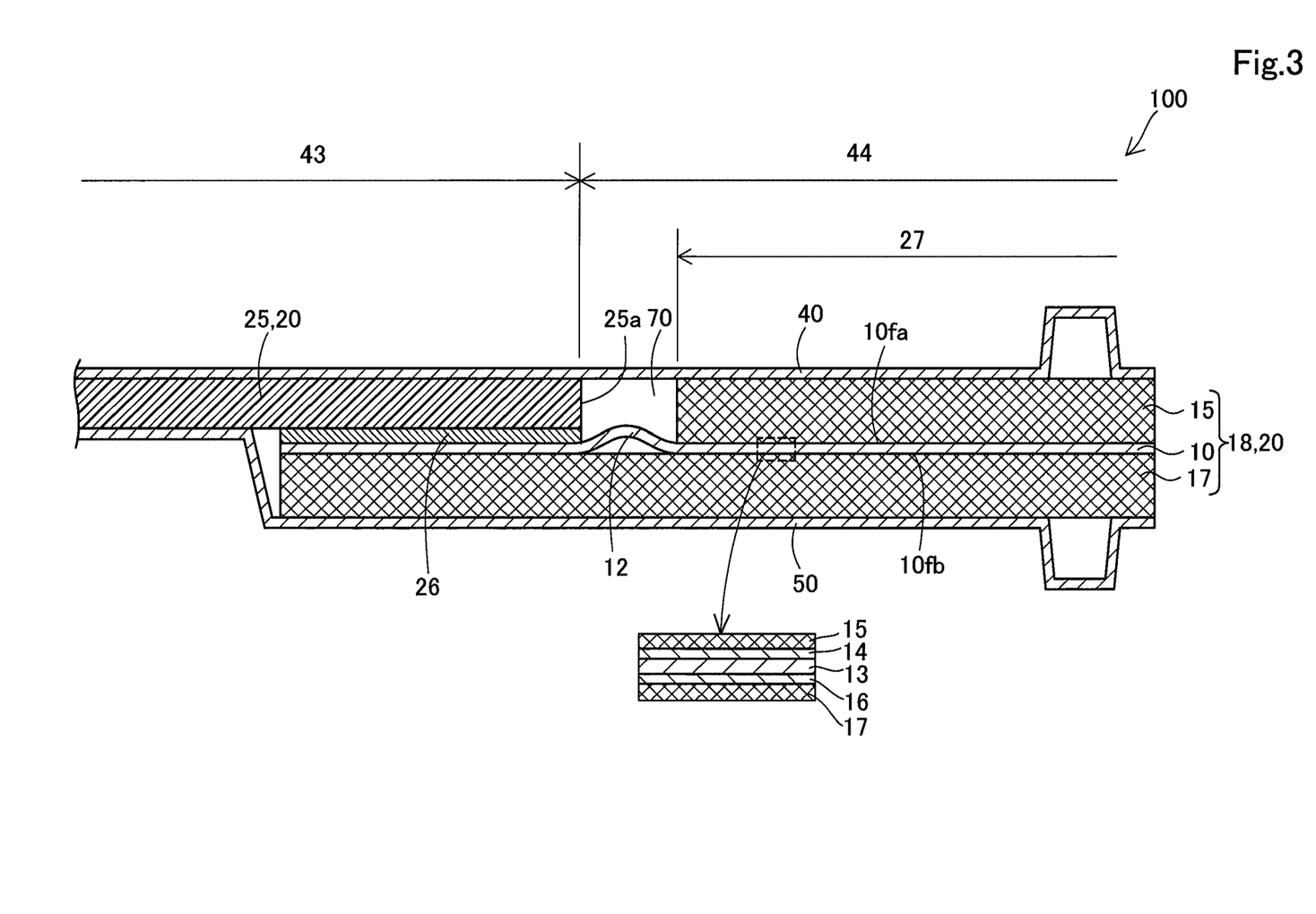
FIG. 3 is a cross-sectional view taken along 3-3 in FIG. 2.

FIG. 1 is an exploded perspective view briefly showing the configuration of a fuel cell (unit cell) 100 of a fuel cell device according to a first embodiment of this disclosure. FIG. 2 is a plan view of the unit cell 100. FIG. 3 is a cross-sectional view taken along 3-3 in FIG. 2. FIGS. 1, 2, and 3, and all the drawings referred to later schematically show parts of the unit cell 100 of this embodiment. Hence, the sizes of the parts shown in the drawings do not indicate the particular sizes thereof.

The fuel cell device of this embodiment has a stack structure with a plurality of stacked unit cells 100 each shown in FIG. 1. While the fuel cell device of this embodiment is a solid polymer fuel cell device, it may be a different type of fuel cell device such as a solid oxide fuel cell device.

As shown in FIG. 3, the unit cell 100 includes a membrane electrode assembly 10 (hereinafter also called an MEA 10), a first gas diffusion layer 15, a second gas diffusion layer 17, a sealing part 25, and separators 40 and 50 in a pair. The direction in which the membrane electrode assembly 10, the first gas diffusion layer 15, the second gas diffusion layer 17, and the separators 40 and 50 in a pair are stacked is also called a stacking direction. In FIG. 3, the stacking direction is a vertical direction.

The MEA 10 is held between the first gas diffusion layer 15 and the second gas diffusion layer 17. A structure in which the first gas diffusion layer 15 and the second gas diffusion layer 17 are stacked on the MEA 10 is also called a membrane electrode gas diffusion layer assembly (MEGA) 18. The sealing part 25 is bonded to an outer edge of the MEA 10. A structure in which the sealing part 25 is bonded to the MEGA 18 is also called a MEGA 20 with seal. In this embodiment, the MEGA 20 with seal is arranged between the separators 40 and 50 in a pair. The surface of the first separator 40 on the opposite side of the surface thereof contacting the MEGA 20 with seal is provided with a gasket 62 (FIG. 2). The gasket 62 is for sealing a fluid flow path between the unit cells 100 adjacent to each other. The gasket 62 may be configured using an elastic body. Examples of the elastic body include rubber and thermoplastic elastomer. The gasket 62 is bonded to the first separator 40 with an adhesive, for example.

The membrane electrode assembly 10 has a rectangular outer shape. As shown in FIG. 3, the membrane electrode assembly 10 includes a first surface 10fa and a second surface 10fb on the opposite side of the first surface 10fa. The first surface 10fa and the second surface 10fb form two main surfaces of the membrane electrode assembly 10. The membrane electrode assembly 10 includes an electrolyte membrane 13, a cathode 14, and an anode 16. The electrolyte membrane 13 is an ion-exchange membrane having proton conductivity made of a polymer electrolyte material such as fluororesin, for example, and exhibits favorable proton conductivity in a humid condition. The cathode 14 is a catalyst electrode layer and is formed on one surface of the electrolyte membrane 13. The anode 16 is a catalyst electrode layer and is formed on the other surface of the electrolyte membrane 13 on the opposite side of the one surface thereof. The cathode 14 and the anode 16 are porous members with pores, and are formed by applying a polymer electrolyte coating having proton conductivity to conductive particles that may be carbon particles, for example, supporting a catalyst that may be platinum or a platinum alloy, for example. The polymer electrolyte forming the cathode 14 and the anode 16 may be a polymer of the same type as or a different type from the polymer electrolyte forming the electrolyte membrane 13.

As shown in FIG. 1, the sealing part 25 is a frame-like member. The sealing part 25 is formed using resin such as thermoplastic resin. The sealing part 25 has an opening area 25a formed at the center as an area for holding the MEA 10 (MEGA 18). The sealing part 25 is provided with a plurality of slit parts 39 to allow the flow of an oxidizing gas and a fuel gas. The slit parts 39 will be described later in detail.

The sealing part 25 is made of a material that may, for example, be modified polyolefin such as modified polypropylene given adhesion properties by introduction of a functional group (ADMER (registered trademark) available from Mitsui Chemicals, Inc., for example). As shown in FIG. 3, the sealing part 25 and the first separator 40, and the sealing part 25 and the second separator 50 are adhesively bonded to each other by hot-pressing. If resin without particular adhesion properties is used for forming the sealing part 25, a layer of an adhesive to exert adhesion properties in response to hot-pressing may be formed on a surface of the sealing part 25, for example. In this case, the sealing part 25 may be made of resin selected from a group consisting of polypropylene (PP), phenolic resin, epoxy resin, polyethylene terephthalate (PET), and polyethylene naphthalate (PEN), for example. The layer of the adhesive formed on the surface of the sealing part 25 may contain a silane coupling agent, for example. In this embodiment, the adhesive bonding between the sealing part 25 and each of the separators 40 and 50 means that this adhesive bonding is realized as thermal welding by means of hot-pressing. Namely, the adhesive bonding between the sealing part 25 and each of the separators 40 and 50 means that a hydrogen bond or a covalent bond is formed as a result of progress of chemical reaction between the surface of the sealing part 25 and the surface of each of the separators 40 and 50. As shown in FIG. 3, the sealing part 25 is bonded with an adhesive 26 to an outer edge of the first surface 10fa.

The first gas diffusion layer 15 and the second gas diffusion layer 17 are made of a material having gas permeability and electron conductivity. For example, the first gas diffusion layer 15 and the second gas diffusion layer 17 may be made of a metallic material such as foam metal or metal mesh, or may be made of a carbon material such as carbon cloth or carbon paper. As shown in FIG. 3, the first gas diffusion layer 15 and the second gas diffusion layer 17 have different sizes. More specifically, the outer shape of the first gas diffusion layer 15 is smaller than that of the second gas diffusion layer 17 in a plan view. The outer shape of the first gas diffusion layer 15 is smaller than that of the membrane electrode assembly 10 in a plan view. The outer shape of the second gas diffusion layer 17 is substantially equal to that of the membrane electrode assembly 10 in a plan view. In this embodiment, a plan view means a view taken when the unit cell 100 is seen from a direction vertical to the first surface 10fa.

The first gas diffusion layer 15 is arranged at the first surface 10fa across the sealing part 25 and a gap 70. Namely, the first gas diffusion layer 15 is arranged in the opening area 25a of the sealing part 25. The second gas diffusion layer 17 is arranged at the second surface 10fb. The gap 70 has a size that preferably allows accommodation of a warped part 12 of the membrane electrode assembly 10. An interval between the sealing part 25 and the first gas diffusion layer 15, which corresponds to the dimension of the gap 70, is 0.5 mm, for example. The membrane electrode assembly 10 includes the warped part 12 arranged in the gap 70 at least in normal humidity. Normal humidity means a state in which relative humidity is 65% plus or minus 20% (the JIS standard, JIS Z 8703). An area of the unit cell 100 in which the anode 16 and the cathode 14, which are electrodes, are arranged, functions as a power generator 27 contributing to power generation. In this embodiment, the power generator 27 is an area inward from the gap 70 in a plan view of the unit cell 100.

As shown in FIG. 1, the first separator 40 and the second separator 50 are rectangular plate-like members. The first separator 40 and the second separator 50 are arranged in such a manner as to hold the MEGA 20 with seal therebetween. The first separator 40 and the second separator 50 have a coefficient of linear expansion higher than that of each of the membrane electrode assembly 10, the first gas diffusion layer 15, and the second gas diffusion layer 17. As shown in FIG. 3, the first separator 40 is located on the first surface 10fa side and is arranged in such a manner as to contact the first gas diffusion layer 15 and the sealing part 25. The second separator 50 is located on the second surface 10fb side and is arranged in such a manner as to contact the second gas diffusion layer 17 and the sealing part 25. The first separator 40 and the second separator 50 are made of a gas-impermeable and conductive material that may be a carbon material such as gas-impermeable dense carbon prepared by compressing carbon, or may be a metallic material such as pressed stainless steel or titanium, for example. In this embodiment, the first separator 40 and the second separator 50 are formed by pressing titanium. The surface of the first separator 40 and the second separator 50 facing the MEGA 18 is provided with a flow path groove for flow of a reactive gas used for electrochemical reaction. This flow path groove is defined by a recess and a projection formed at the surface of the first separator 40 and the second separator 50. These recess and projection are omitted from FIG. 1. As shown in FIG. 3, a part of the first separator 40 in contact with the sealing part 25 is also called an outer peripheral part 43, and a part of the first separator 40 inward from the outer peripheral part 43, namely, closer to the center than the outer peripheral part 43 of the first separator 40 in a plan view is also called a center part 44.

As shown in FIG. 1, each of the first separator 40, the second separator 50, and the sealing part 25 is provided with manifold holes 31 to 36 for forming manifolds at positions differing from each other in the stacking direction. Each of the manifolds is a flow path penetrating the fuel cell device with the stacked unit cells 100 in the stacking direction, communicating with an in-cell gas flow path formed in the unit cell 100 or with a cell-to-cell coolant flow path formed between the unit cells 100 adjacent to each other, and used for the flow of a reactive gas or a coolant. More specifically, the manifold holes 31 and 36 form an oxidizing gas manifold for supply and discharge of the oxidizing gas to and from an in-cell oxidizing gas flow path. The manifold holes 33 and 34 form a fuel gas manifold for supply and discharge of the fuel gas to and from an in-cell fuel gas flow path. The manifold holes 32 and 35 form a coolant manifold for supply and discharge of the coolant to and from the cell-to-cell coolant flow path. The slit parts 39 include slits that are a plurality of elongated holes extending from outer peripheries and their vicinities of the manifold holes 31, 33, 34, and 36 toward an outer periphery and its vicinity of the MEGA 18. The slits form communication flow paths for communicating the manifold holes 31, 33, 34, and 36 with the corresponding in-cell gas flow paths within the unit cell 100 when the sealing part 25 is caught between the separators 40 and 50 in a pair. Specifically, the manifold holes 33 and 34 are communicated with the in-cell fuel gas flow path, and the manifold holes 31 and 36 are communicated with the in-cell oxidizing gas flow path.

Figure 4:
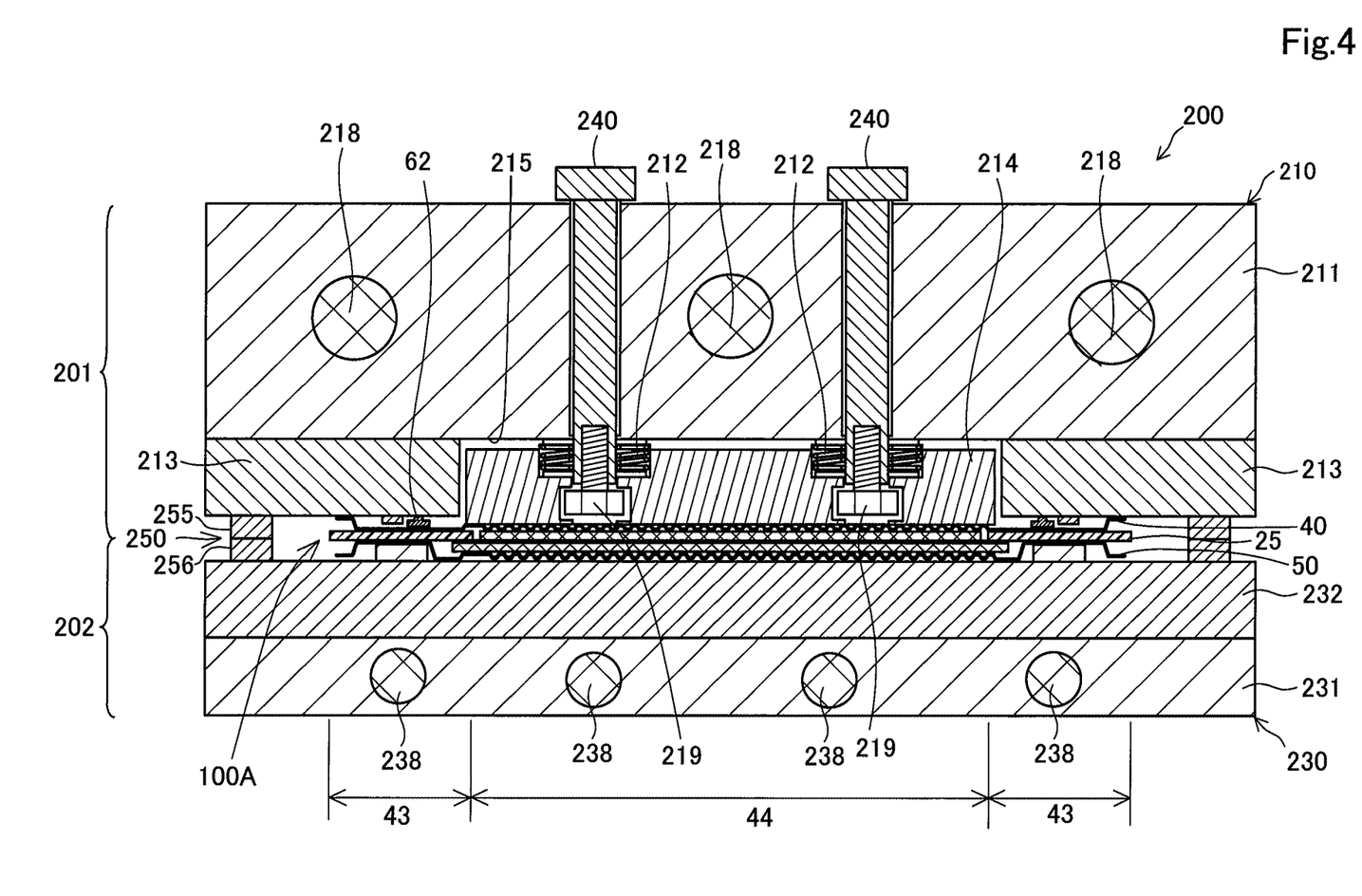
FIG. 4 is a view for explaining a manufacturing device for the unit cell.

FIG. 4 is a view for explaining a manufacturing device 200 for the unit cell 100. The manufacturing device 200 is a device for bonding the sealing part 25 and the first separator 40 to each other and bonding the sealing part 25 and the second separator 50 to each other by hot-pressing a unit cell 100A before bonding. The unit cell 100A before bonding is a unit cell in a state before the bonding between the sealing part 25 and the first separator 40 and before the bonding between the sealing part 25 and the second separator 50.

The manufacturing device 200 includes a first manufacturing device 201 for heating the first separator 40 and a second manufacturing device 202 for heating the second separator 50.

The first manufacturing device 201 includes a first heater unit 210, a first member 213, a second member 214, a shaft 240, a support member 219, and an elastic body 212. An actuator not shown in the drawings allows the first manufacturing device 201 to move up and down. The first heater unit 210 includes a body 211 made of metal such as iron or stainless steel, and a heating part 218 arranged in the body 211. The body 211 has a shape like a rectangular solid. The heating part 218 is used for heating the body 211. For example, the heating part 218 can utilize a heating wire or a heat pipe.

The first member 213 is formed integrally with the first heater unit 210. The first member 213 is increased in temperature by heat transferred from the first heater unit 210. The first member 213 presses and heats the first separator 40. More specifically, the first member 213 contacts the outer peripheral part 43 of the first separator 40 in contact with the sealing part 25 to heat the outer peripheral part 43 by heat transfer. The first member 213 is attached to a surface 215 of the first heater unit 210 facing the second manufacturing device 202. More specifically, the first member 213 is arranged in a frame-like pattern at an edge portion of the rectangular surface 215. The first member 213 is made of metal such as iron or stainless steel.

The second member 214 is a member separate from the first member 213. The second member 214 is supported by the first heater unit 210 in such a manner as to be movable up and down independently of the first heater unit 210. The second member 214 is inward from the first member 213 arranged in a frame-like pattern, namely, arranged in the frame of the first member 213. The second member 214 has a rectangular solid shape. The second member 214 is increased in temperature by heat transferred from the first heater unit 210. The second member 214 contacts the center part 44 of the first separator 40 to heat the center part 44 by heat transfer. The center part 44 is a part mainly overlapping the power generator 27. The second member 214 is made of metal such as iron or stainless steel.

The shaft 240 is passed through the first heater unit 210. The shaft 240 has a lower end arranged in the second member 214. The support member 219 is attached to the lower end of the shaft 240 to support the second member 214. More specifically, the support member 219 regulates the motion of the second member 214 in such a manner as to prevent the second member 214 from moving farther from the first heater unit 210 by a predetermined distance or more. In this embodiment, the support member 219 is a bolt and the motion of the second member 214 is regulated with the head of the bolt.

The elastic body 212 biases the second member 214 toward the first separator 40. Namely, the elastic body 212 biases the second member 214 in a direction of moving farther from the first heater unit 210. The elastic body 212 is a compression coil spring, for example. The elastic body 212 is arranged between the first heater unit 210 and the second member 214. The second member 214 presses the first separator 40 using the force of the elastic body 212. Pressing the first separator 40 with the second member 214 using the force of the elastic body 212 allows application of force within a predetermined range to the first separator 40. This achieves more efficient transfer of heat from the second member 214 to the first separator 40. At this point, the second member 214 presses the center part 44 of the first separator 40. The center part 44 is a part where the membrane electrode assembly 10, the first gas diffusion layer 15, and the second gas diffusion layer 17 overlap each other. Using the elastic body 212 reduces the probability of application of excessive pressing force to the first separator 40, thereby preventing damage to the membrane electrode assembly 10, the first gas diffusion layer 15, or the second gas diffusion layer 17.

The second manufacturing device 202 is arranged on the opposite side of the first manufacturing device 201 across an area for arrangement of the unit cell 100A before bonding. The second manufacturing device 202 is arranged below the first manufacturing device 201. The second manufacturing device 202 includes a second heater unit 230 and a third member 232.

The second heater unit 230 includes a body 231 made of metal such as iron or stainless steel, and a heating part 238 arranged in the body 231. The body 231 has a shape like a rectangular solid. The heating part 238 is used for heating the body 231. For example, the heating part 238 can utilize a heating wire or a heat pipe.

The third member 232 is formed integrally with the second heater unit 230. The third member 232 is increased in temperature by heat transferred from the second heater unit 230. The third member 232 has a shape like a rectangular solid. The third member 232 is larger in size than the cell 100A before bonding in a plan view.

The manufacturing device 200 further includes a stopper member 250 for maintaining an interval between the first member 213 and the third member 232 at a predetermined value or more. The stopper member 250 includes a first protruding member 255 protruding from the first member 213 toward the third member 232, and a second protruding member 256 protruding from the third member 232 toward the first member 213. When the first manufacturing device 201 moves toward the second manufacturing device 202 to make the interval between the first member 213 and the third member 232 reach the predetermined value, the first protruding member 255 and the second protruding member 256 come into abutting contact with each other. By doing so, the interval between the first member 213 and the third member 232 is maintained at the predetermined value or more. This reduces the probability of application of excessive load from the manufacturing device 200 to the unit cell 100A before bonding, thereby preventing damage to the unit cell 100A before bonding.

Figure 5:
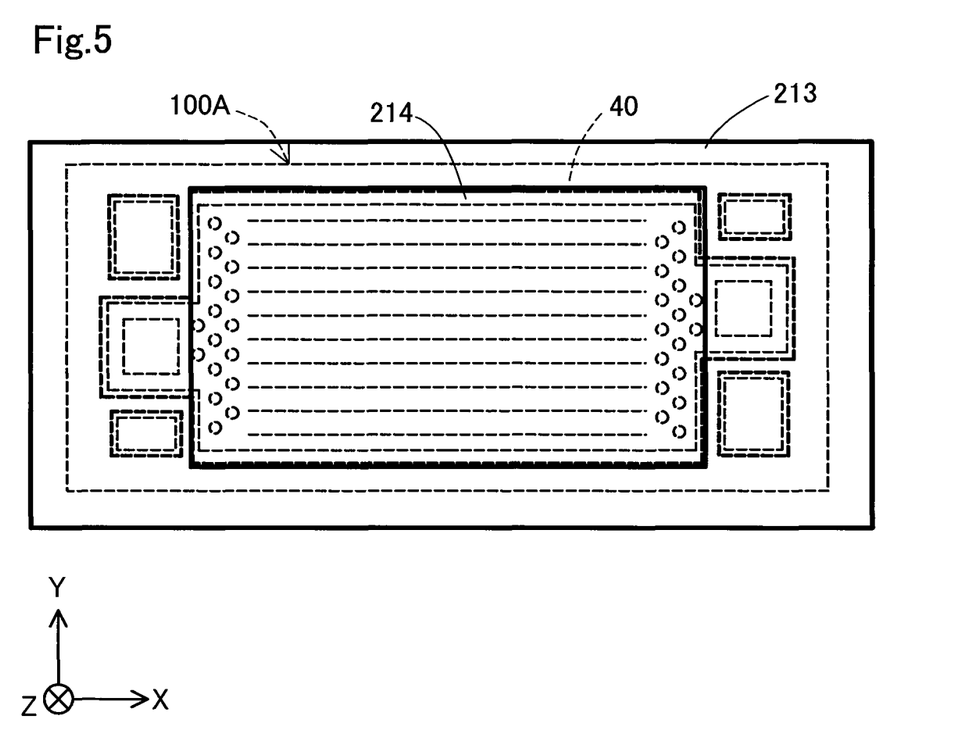
FIG. 5 is a schematic view showing the position of the manufacturing device and that of a unit cell before bonding relative to each other.

FIG. 5 is a schematic view showing the position of the manufacturing device 200 and that of the unit cell 100A before bonding relative to each other. As shown in FIG. 5, the first member 213 and the second member 214 of the manufacturing device 200 overlap with the entire first separator 40 in a plan view. Namely, the first separator 40 is heated entirely using the first member 213 and the second member 214. While not shown in FIG. 5, the third member 232 overlaps with the entire second separator 50 in a plan view. Namely, the second separator 50 is heated entirely using the third member 232.

Figure 6:
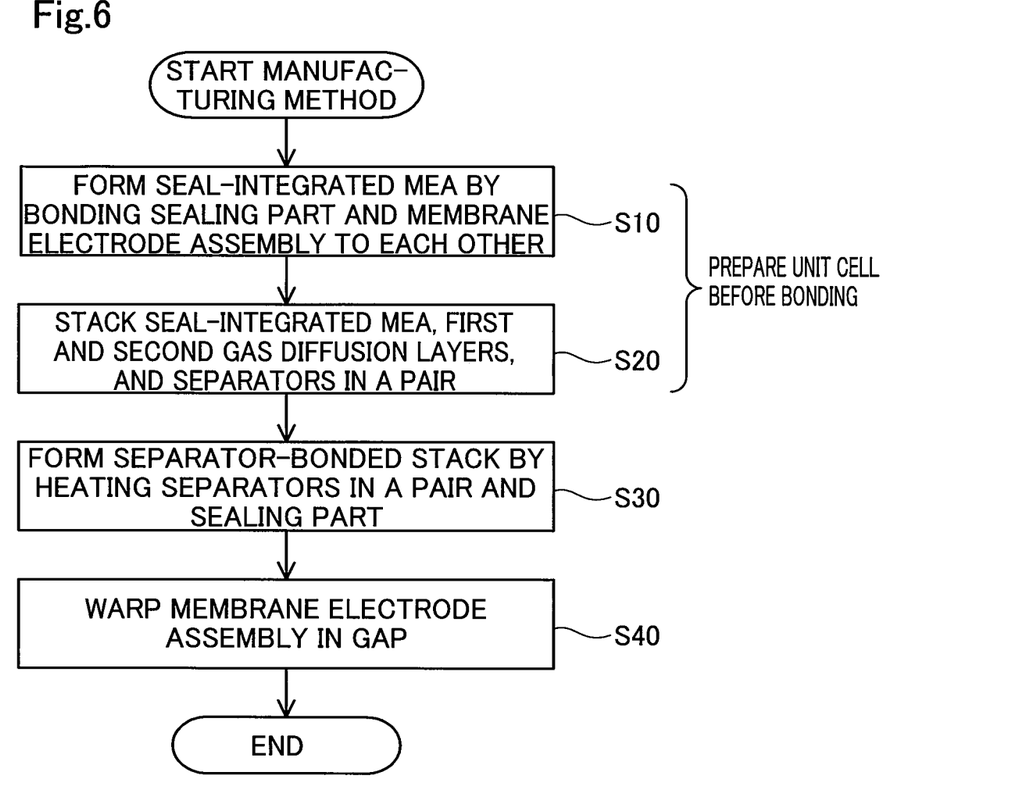
FIG. 6 is a flowchart showing process of manufacturing the unit cell.
Figure 7:
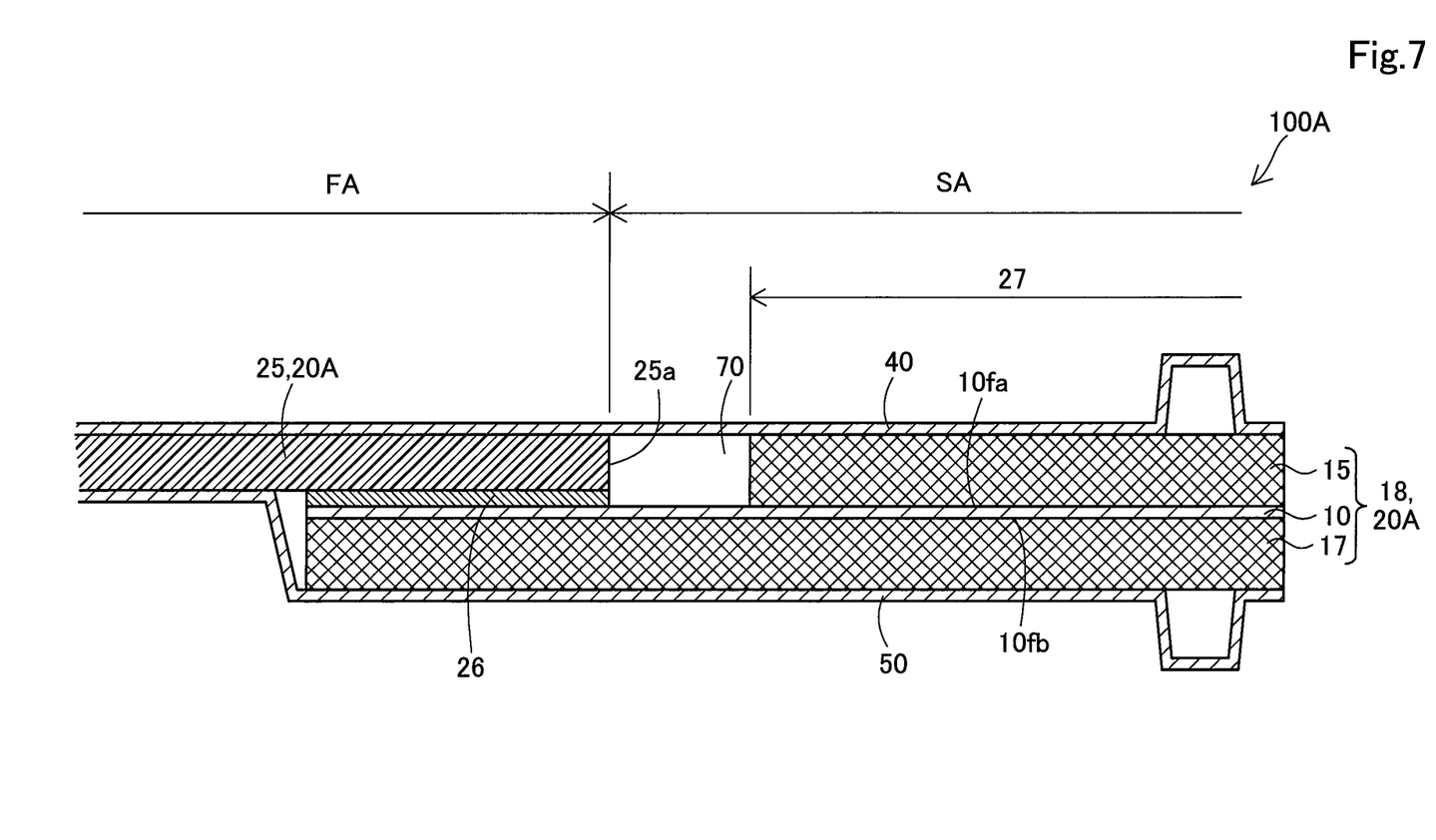
FIG. 7 is a first view for explaining the manufacturing process.
Figure 8:
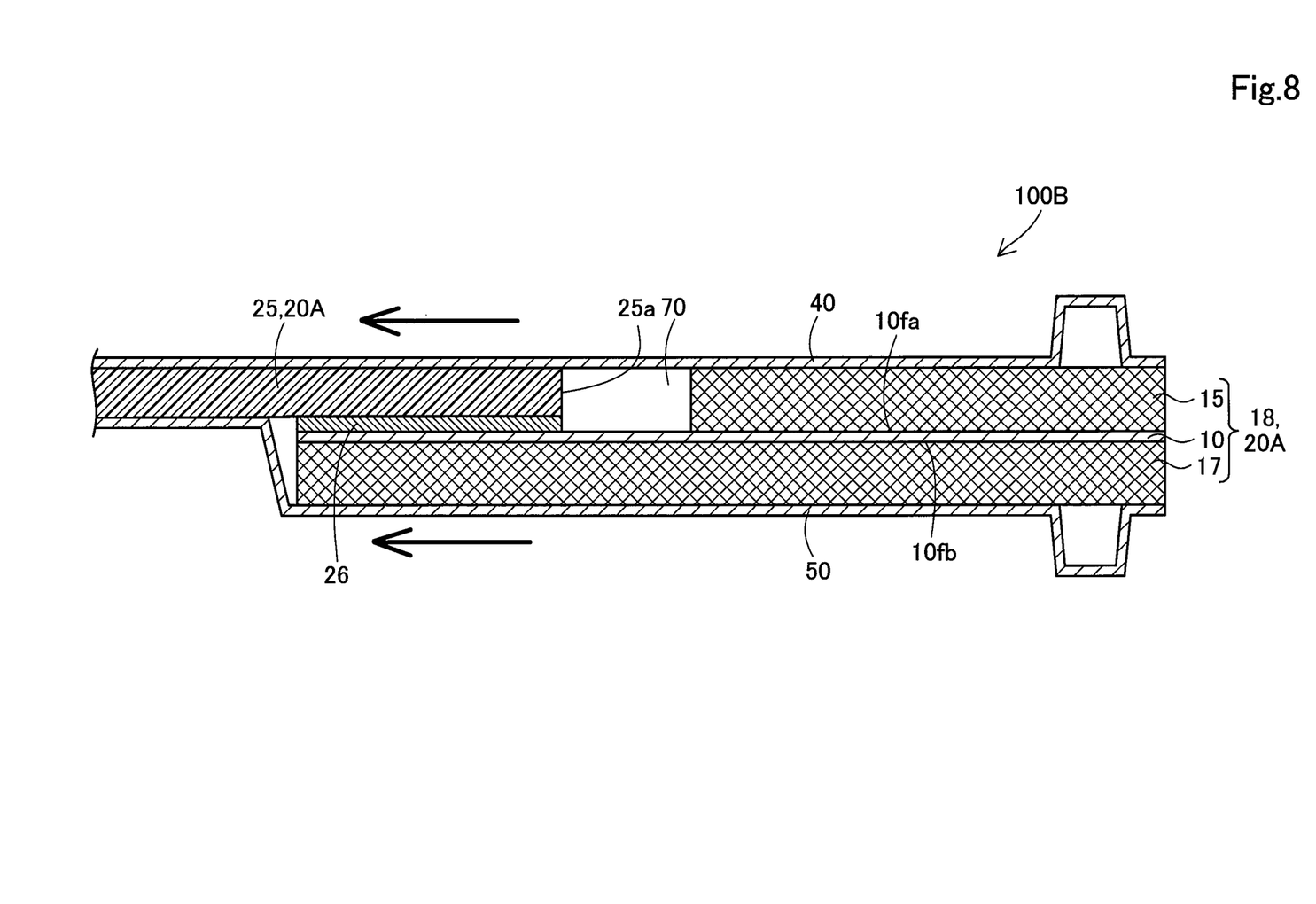
FIG. 8 is a second view for explaining the manufacturing process.
Figure 9:
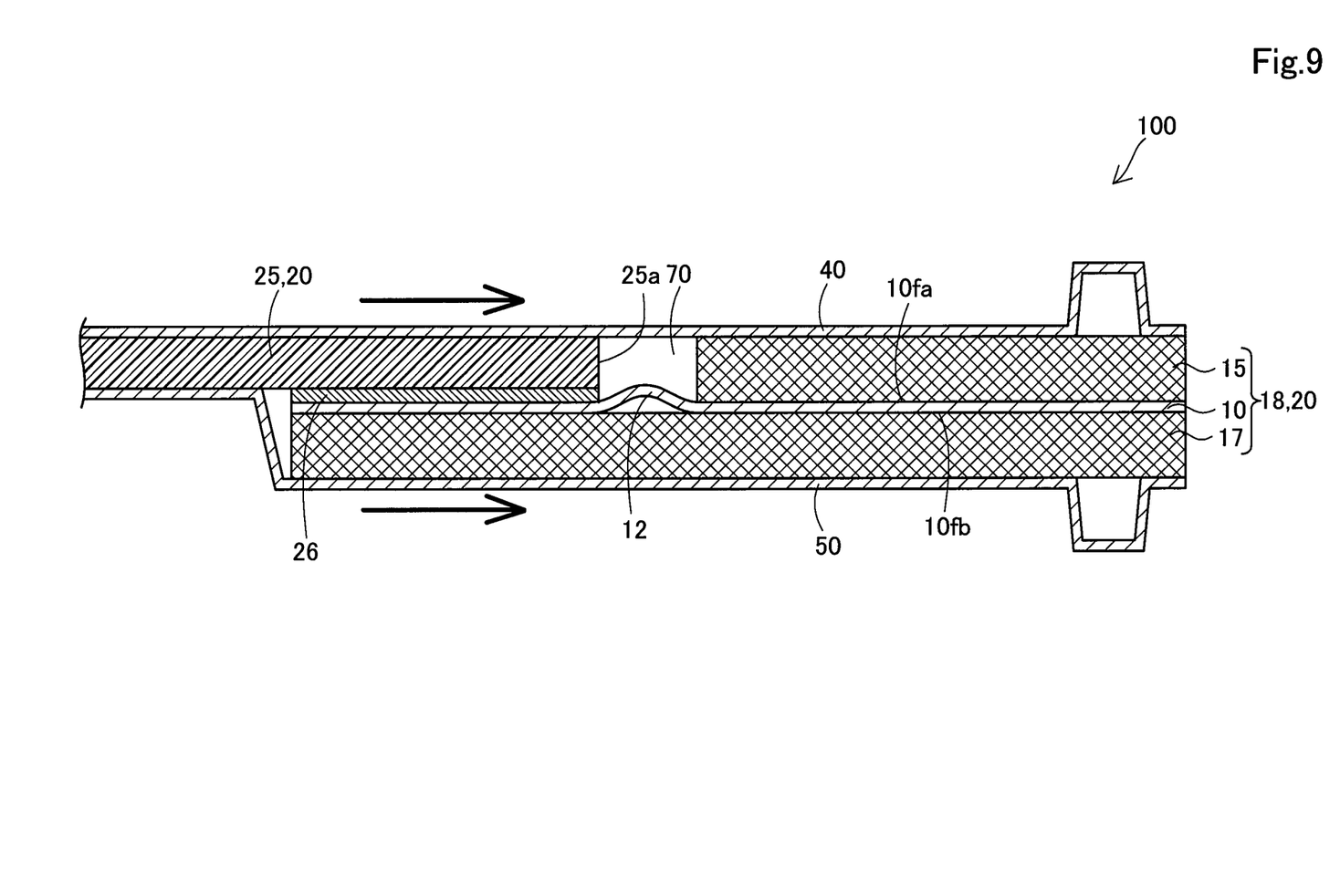
FIG. 9 is a third view for explaining the manufacturing process.

FIG. 6 is a flowchart showing process of manufacturing the unit cell 100. FIG. 7 is a first view for explaining the manufacturing process. FIG. 8 is a second view for explaining the manufacturing process. FIG. 9 is a third view for explaining the manufacturing process.

First, in step S10 and step S20, the unit cell 100A before bonding is prepared. As shown in FIG. 7, the unit cell 100A before bonding includes a stack 20A, and the separators 40 and 50 in a pair. The stack 20A includes the membrane electrode assembly 10, the frame-like sealing part 25 bonded with the adhesive 26 to the outer edge of the first surface 10*fa* of the membrane electrode assembly 10, the first gas diffusion layer 15, and the second gas diffusion layer 17. In the stack 20A, the membrane electrode assembly 10 extends straight without being warped in the gap 70.

In step S10, the membrane electrode assembly 10 and the sealing part 25 are bonded to each other to form a seal-integrated MEA. More specifically, the sealing part 25 is adhesively bonded with the adhesive 26 to the outer edge of the first surface 10*fa* of the membrane electrode assembly 10. In step S20 performed after step S10, the seal-integrated MEA, the first gas diffusion layer 15, the second gas diffusion layer 17, and the separators 40 and 50 in a pair are stacked. More specifically, as shown in FIG. 7, the first gas diffusion layer 15 is arranged at the first surface 10*fa* across the sealing part 25 and the gap 70. The second gas diffusion layer 17 is arranged at the second surface 10*fb*. Further, the separators 40 and 50 in a pair are arranged in such a manner as to hold the stack 20A therebetween. At this point, an area of each of the separators 40 and 50 in a pair overlapping the sealing part 25 in a plan view is called a first area FA. An area of each of the separators 40 and 50 in a pair overlapping an area in the stack 20A inward from the sealing part 25 and inside the frame of the sealing part 25 in a plan view is called a second area SA.

Next, in step S30, the separators 40 and 50 in a pair and the sealing part 25 are bonded to each other to form a separator-bonded stack 100B. More specifically, as shown in FIG. 8, the separators 40 and 50 in a pair are heated using the manufacturing device 100, thereby thermally expanding the separators 40 and 50 in a pair to move the separators 40 and 50 in a pair outward relative to the sealing part 25. Then, the separators 40 and 50 in a pair and the sealing part 25 are bonded to each other. In step S30, the prepared unit cell 100A before bonding is installed on the manufacturing device 200, and the separators 40 and 50 in a pair and the sealing part 25 are bonded to each other by hot-pressing. Namely, the separators 40 and 50 in a pair are heated under pressure to be bonded to the sealing part 25. A condition for the hot-pressing is settable in a range allowing bonding of the sealing part 25 to the separators 40 and 50 in a pair. For example, the hot-pressing is performed under conditions of 160° C. (in Celsius) and 30 seconds. The temperature as a condition for hot-pressing is the temperature of each of the separators 40 and 50 in a pair, for example. Humidity is not particularly limited as a condition for the hot-pressing. The hot-pressing may be performed in normal humidity.

As shown in FIG. 4, the first heater unit 210 and the second heater unit 230 are arranged in such a manner as to overlap the entire first separator 40 in a plan view. Thus, the first separator 40 is heated entirely in step S30. More specifically, the first area FA of the first separator 40 is heated by the first member 213, and the second area SA of the first separator 40 is heated by the second member 214. The third member 232 is arranged in such a manner as to overlap the entire second separator 50 in a plan view. Thus, the second separator 50 is heated entirely in step S30. The heating step is performed while the unit cell 100A before bonding is pressed by the manufacturing device 200. More specifically, during implementation of the heating step, the second member 214 presses the first separator 40 using the force of the elastic body 212 and the first member 213 presses the first separator 40. During implementation of the heating step, the third member 232 presses the second separator 50.

As shown in FIG. 8, in the step of bonding the separators 40 and 50 in a pair and the sealing part 25 to each other in step S30, the separators 40 and 50 in a pair are heated entirely to be thermally expanded. Namely, the separators 40 and 50 in a pair extend in an in-plane direction to move outward relative to the sealing part 25 indicated by arrow directions. When the separators 40 and 50 in a pair and the sealing part 25 are increased in temperature to be placed at a predetermined temperature or more, the separators 40 and 50 in a pair and the sealing part 25 are bonded to each other. Namely, as the separators 40 and 50 in a pair are increased in temperature to be thermally expanded, the separators 40 and 50 in a pair move outward relative to the sealing part 25. Then, as the temperatures of the separators 40 and 50 in a pair and the sealing part 25 are increased further, the separators 40 and 50 in a pair and the sealing part 25 are bonded to each other.

As shown in FIG. 6, after implementation of step S30, the membrane electrode assembly with the bonded sealing part is warped in the gap in step S40. More specifically, the separator-bonded stack 100B is cooled to reduce the temperature of the separator-bonded stack 100B. This temperature reduction causes thermal shrinkage of the separators 40 and 50 in a pair, thereby moving the sealing part 25 inward as shown in FIG. 9 while the separators 40 and 50 in a pair are bonded to the sealing part 25. As a result, the membrane electrode assembly 10 with the bonded sealing part 25 is warped in the gap 70. The thermal shrinkage of the separators 40 and 50 in a pair reduces the size of the sealing part 25 bonded to the separators 40 and 50 in a pair compared to the size of the sealing part 25 in the unit cell 100A before bonding. This also reduces the size of the gap 70 compared to a size thereof immediately after implementation of step S30. By contrast, the first gas diffusion layer 15, the second gas diffusion layer 17, and the membrane electrode assembly 10 are changed in size to lesser degrees than the separators 40 and 50 in a pair and the sealing part 25 for the low coefficients of linear expansion of the first gas diffusion layer 15, the second gas diffusion layer 17, and the membrane electrode assembly 10. In this embodiment, the first gas diffusion layer 15, the second gas diffusion layer 17, and the membrane electrode assembly 10 show little changes in size in step S30 or in step S40. As a result, the warped part 12 is formed in the gap 70 in response to change in the shape of the sealing part 25.

The separators 40 and 50 in a pair are cooled, for example, by cooling the separator-bonded stack 100B in normal humidity to a temperature of equal to or less than 100° C., for example, to about 25° C. In step S40, the separator-bonded stack 100B may be detached from the manufacturing device 200 and may be cooled by natural cooling. If the manufacturing device 200 includes a cooling mechanism, the separator-bonded stack 100B may be cooled by stopping the operations of the heating parts 218 and 238 and operating the cooling mechanism. The cooling mechanism may be realized by providing the first heater unit 210 or the second heater unit 230 with a pipe for the flow of cooling water.

According to the foregoing embodiment, the warped part 12 is formed in the gap 70 by taking advantage of a difference in coefficient of linear expansion between the separators 40 and 50 in a pair and the electrolyte membrane 13. This eliminates a need for drying the membrane electrode assembly 10 in advance for warping the membrane electrode assembly 10 to avoid complication of control of the process of manufacturing the unit cell 100, thereby preventing reduction in the productivity of the unit cell 100. According to the foregoing embodiment, the separators 40 and 50 in a pair are heated entirely to allow the separators 40 and 50 in a pair to be thermally expanded further. This allows the membrane electrode assembly 10 to be warped more largely in the cooling step. According to the foregoing embodiment, in the heating step, the first area FA of the first separator 40 is hot-pressed by the first member 213 and the second area SA of the first separator 40 is hot-pressed by the second member 214. Namely, the first area FA and the second area SA can be hot-pressed in ways responsive to the first area FA and the second area SA. Additionally, as the first member 213 and the second member 214 are separate from each other, the manufacturing device 200 is made available as a device for hot-pressing using only the first member 213 by removing the second member 214 from the manufacturing device 200. According to the foregoing embodiment, the second member 214 presses the first separator 400 using the elastic body 212 to allow more efficient transfer of heat from the second member 214 to the first separator 40.

B. Other Embodiments

B-1. First Other Embodiment

According to the foregoing first embodiment, the separators 40 and 50 in a pair are heated entirely in step S30. However, this is not the only configuration. What is required in step S30 is to heat the second area SA in addition to the first area FA, and the second area SA may be an area of the separators 40 and 50 in a pair overlapping with at least a part of an area in the stack 20A inward from the sealing part 25 in a plan view. Even in this configuration, heating the second area SA in addition to the first area FA of the first separator 40 in step S30 still makes it possible to cause thermal expansion.

B-2. Second Other Embodiment

While the first member 213 and the second member 214 are separate from each other (FIG. 4) according to the foregoing embodiment, this is not the only configuration and the first member 213 and the second member 214 may be integrated with each other. While the second member 214 is biased by the elastic body 212 according to the foregoing embodiment, the elastic body 212 is omissible. The elastic body 212 may be provided on the side of the third member 232. More specifically, the third member 232 may be divided into a first area portion facing the first area FA and a second area portion facing the second area SA. Then, an elastic body for biasing the second area portion toward the second separator 50 may be provided.

This disclosure is not limited to the foregoing embodiments but is feasible in various configurations within a range not deviating from the substance of this disclosure. For example, technical features in the embodiments corresponding to those in each of the aspects described in SUMMARY may be replaced or combined, where appropriate, with the intention of solving some or all of the aforementioned problems or achieving some or all of the aforementioned effects. Unless being described as absolute necessities in this specification, these technical features may be deleted, where appropriate. The present disclosure may be implemented by aspects described below.

(1) According to one aspect of this disclosure, a manufacturing method for a fuel cell is provided. The manufacturing method for the fuel cell includes the steps of: (a) preparing a stack and separators in a pair arranged in such a manner as to hold the stack therebetween, the stack including a membrane electrode assembly having a first surface and a second surface on the opposite side of the first surface, a frame-like sealing part bonded to an outer edge of the first surface, a first gas diffusion layer having a smaller outer shape than the membrane electrode assembly in a plan view and arranged at the first surface across the sealing part and a gap, and a second gas diffusion layer arranged at the second surface; (b) forming a separator-bonded stack by heating the separators in a pair to thermally expand the separators in a pair and move the separators in a pair outward relative to the sealing part, and then bonding the separators in a pair and the sealing part to each other; and (c) warping the membrane electrode assembly with the bonded sealing part in the gap by reducing the temperature of the separator-bonded stack to cause thermal shrinkage of the separators in a pair, thereby moving the sealing part with the bonded separators in a pair inward, the step (c) being performed after the step (b).

This aspect eliminates a need for drying the membrane electrode assembly in advance for warping the membrane electrode assembly to avoid complication of control of the process of manufacturing the fuel cell. As a result, reduction in the productivity of the fuel cell is prevented.

(2) According to the foregoing aspect, the step (b) may include a step of causing thermal expansion of the separators in a pair by heating a first area of each of the separators in a pair overlapping the sealing part in a plan view and a second area of each of the separators in a pair overlapping at least a part of an area in the stack inward from the sealing part in a plan view.

This aspect achieves thermal expansion of the separators in a pair through heating of the first area and the second area.

(3) According to the foregoing aspect, in the step of causing the thermal expansion, the separators in a pair may be heated entirely.

According to this aspect, heating the separators in a pair entirely allows the separators in a pair to be thermally expanded further. This allows the membrane electrode assembly to be warped more largely in the step (c).

(4) According to the foregoing aspect, in the step (b), the separators in a pair may be heated using a manufacturing device, the manufacturing device may include a first manufacturing device for heating a first separator forming the separators in a pair and arranged on the first surface side, the first manufacturing device may include a first member facing the first area of the first separator and used for heating the first area, and a second member separate from the first member and used for heating the second area of the first separator, and in the step (b), the first area of the first separator may be heated by the first member and the second area of the first separator may be heated by the second member.

This aspect allows heating of the first separator using the first member and the second member.

(5) According to the foregoing aspect, the manufacturing device may include an elastic body for pressing the second member toward the first separator, and the step (b) may be performed while the second member presses the first separator using the force of the elastic body.

According to this aspect, causing the second member to press the first separator using the force of the elastic body allows heat to be transferred more efficiently from the second member to the first separator.

This disclosure is feasible in various aspects such as a manufacturing device for a fuel cell, a fuel cell, a fuel cell device with a fuel cell, and a manufacturing method for a fuel cell device, for example, in addition to the manufacturing method for the fuel cell described above.

What is claimed is:

1. A manufacturing method for a fuel cell comprising the steps of:
    (a) preparing a stack and separators in a pair arranged in such a manner as to hold the stack therebetween, the stack including a membrane electrode assembly having a first surface and a second surface on the opposite side of the first surface, a frame-like sealing part bonded to an outer edge of the first surface, a first gas diffusion layer having a smaller outer shape than the membrane electrode assembly in a plan view and arranged at the first surface across the sealing part and a gap, and a second gas diffusion layer arranged at the second surface;
    (b) forming a separator-bonded stack by heating the separators in a pair to thermally expand the separators in a pair to move the separators in a pair outward relative to the sealing part, and then bonding the separators in a pair and the sealing part to each other; and
    (c) warping the membrane electrode assembly with the bonded sealing part in the gap by reducing the temperature of the separator-bonded stack to cause thermal shrinkage of the separators in a pair, thereby moving the sealing part with the bonded separators in a pair inward, the step (c) being performed after the step (b);
    wherein the step (b) includes a step of causing thermal expansion of the separators in a pair by heating a first area of each of the separators in a pair overlapping with the sealing part in a plan view and a second area of each of the separators in a pair overlapping with at least a part of an area in the stack inward from the sealing part in a plan view;
    wherein in the step (b), the separators in a pair are heated using a manufacturing device,
    the manufacturing device includes a first manufacturing device for heating a first separator forming the separators in a pair and arranged on the first surface side,
    the first manufacturing device includes a first member facing the first area of the first separator and used for heating the first area, and a second member separate from the first member and used for heating the second area of the first separator, and
    in the step (b), the first area of the first separator is heated by the first member and the second area of the first separator is heated by the second member;
    wherein the manufacturing device includes an elastic body for pressing the second member toward the first separator, and the step (b) is performed while the second member presses the first separator using the force of the elastic body;
    wherein the first manufacturing device further includes a first heater unit located on the opposite side of the first separator across from the second member, a shaft passed through the first heater unit, and a support member attached to a lower end of the shaft to support the second member,
    wherein the second member is supported by the support member so that the second member is movable independently of the first heater unit, and
    the support member is arranged in the second member and regulates a motion of the second member to prevent the second member from moving farther from the first heater unit by a predetermined distance or more.

2. The manufacturing method according to claim 1, wherein the support member is a bolt.

* * * * *